(12) United States Patent
Jia et al.

(10) Patent No.: US 8,488,013 B2
(45) Date of Patent: Jul. 16, 2013

(54) SYSTEM FOR REMOTE CONTROL OF A MEDICAL IMAGING SYSTEM

(75) Inventors: Yuanyuan Jia, Chicago, IL (US); Wei Qu, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 521 days.

(21) Appl. No.: 12/351,943

(22) Filed: Jan. 12, 2009

(65) Prior Publication Data

US 2009/0189988 A1    Jul. 30, 2009

Related U.S. Application Data

(60) Provisional application No. 61/024,617, filed on Jan. 30, 2008.

(51) Int. Cl.
*H04N 5/232* (2006.01)

(52) U.S. Cl.
USPC ............. 348/211.99; 348/143; 348/211.4

(58) Field of Classification Search
USPC .................. 348/211.4, 143, 211.99
See application file for complete search history.

(56) References Cited

U.S. PATENT DOCUMENTS

| | | | |
|---|---|---|---|
| 6,400,155 B2 * | 6/2002 | Kormos et al. | 324/318 |
| 6,603,494 B1 * | 8/2003 | Banks et al. | 715/807 |
| 6,689,055 B1 * | 2/2004 | Mullen et al. | 600/300 |
| 7,263,710 B1 * | 8/2007 | Hummel et al. | 725/86 |
| 7,432,949 B2 * | 10/2008 | Remy et al. | 348/14.02 |
| 2001/0050610 A1 * | 12/2001 | Gelston | 340/5.53 |
| 2002/0128538 A1 | 9/2002 | Thompson | |
| 2003/0122936 A1 * | 7/2003 | Pyle et al. | 348/211.99 |
| 2003/0181804 A1 | 9/2003 | Gagnon et al. | |
| 2004/0223054 A1 * | 11/2004 | Rotholtz | 348/143 |
| 2005/0052527 A1 * | 3/2005 | Remy et al. | 348/14.08 |
| 2005/0140521 A1 * | 6/2005 | Lin et al. | 340/825.69 |
| 2006/0068834 A1 * | 3/2006 | Jones | 455/550.1 |
| 2007/0038065 A1 * | 2/2007 | Creighton et al. | 600/407 |
| 2007/0255115 A1 * | 11/2007 | Anglin et al. | 600/300 |
| 2007/0258626 A1 * | 11/2007 | Reiner | 382/115 |
| 2008/0027306 A1 * | 1/2008 | Washburn et al. | 600/410 |
| 2008/0146277 A1 * | 6/2008 | Anglin et al. | 455/556.1 |
| 2009/0043578 A1 * | 2/2009 | Burke | 704/246 |
| 2009/0062646 A1 * | 3/2009 | Creighton et al. | 600/437 |
| 2010/0183199 A1 * | 7/2010 | Smith et al. | 382/117 |

* cited by examiner

*Primary Examiner* — Antoinette Spinks
(74) *Attorney, Agent, or Firm* — Alexander J Burke

(57) ABSTRACT

A system enables secure, safe remote access and control of stand-alone medical imaging systems whilst maintaining physical separation and independence from the medical imaging systems, to prevent medical system infection by a software virus and data corruption. A system provides remote control and interaction with a medical imaging system and includes a transmitter. The transmitter wirelessly transmits command signals via a first secure communication link to a receiver unit coupled to a medical imaging system. The command signals enable control of the medical imaging system from a remote location. At least one computer receives video data from a camera located near the medical imaging system and monitors medical images and associated data presented on a display of the medical imaging system in response to command signals wirelessly communicated to the receiver unit. A monitor presents the received video data to a user. Also a user interface enables a user to provide commands for controlling the medical imaging system via the command signals from the remote location.

19 Claims, 4 Drawing Sheets

SYSTEM FOR REMOTE CONTROL OF A MEDICAL IMAGING SYSTEM

This is a non-provisional application of provisional application Ser. No. 61/024,617 filed Jan. 30, 2008, by W. Qu et al.

FIELD OF THE INVENTION

This invention concerns a system for providing remote control and interaction with a medical imaging system involving remotely video monitoring the medical imaging system and providing commands for controlling the medical imaging system from a remote location.

BACKGROUND OF THE INVENTION

Medical imaging systems such as angiography, computing topography (CT), and magnetic resonance (MR) systems are widely used in hospitals for diagnosis and therapy. Such medical imaging systems are usually stand-alone medical devices because of safety considerations. A direct connection with either an o intranet or the Internet increases software system exposure to viruses which is dangerous when a patient is undergoing diagnosis or treatment. Consequently, medical devices are typically operationally configured to prevent regular remote access via Windows Net-meeting, Remote Assistance, or other TCP/IP based desktop sharing schemes, for example. However, remote access and control of these medical imaging systems is sometimes desirable. For example, when a user desires to hold a remote diagnostic meeting for a patient, an off-site remotely located physician may want to directly access and control a medical imaging system to view and manipulate captured images or to use post-processing features for diagnosis. Similarly, remote access is desirable for technical support, for training or for education to address technical questions and to initiate or validate software updates and for other purposes. Remote access and control of a stand alone medical imaging system enables a technician to investigate and address problems directly without the need to visit a hospital. This accelerates provision of technical support and reduces costs.

Known remote executable application control systems are burdened by a need to modify system configurations or execute a software procedure within a controlled system. A system according to invention principles addresses the identified need for medical imaging system remote access and control and associated problems.

SUMMARY OF THE INVENTION

A system enables secure, virus-free, safe remote access and control of stand-alone medical imaging systems without change of imaging system settings or execution of additional programs within a medical imaging system. A system provides remote control and interaction with a medical imaging system and includes a transmitter. The transmitter wirelessly transmits command signals via a first secure communication link to a receiver unit coupled to a medical imaging system. The command signals enable control of the medical imaging system from a remote location. At least one computer receives video data from a camera located near the medical imaging system and monitors medical images and associated data presented on a display of the medical imaging system in response to command signals wirelessly communicated to the receiver unit. A monitor presents the received video data to a user. Also a user interface enables a user to provide commands for controlling the medical imaging system via the command signals from the remote location.

DETAILED DESCRIPTION OF THE INVENTION

Figure 1:
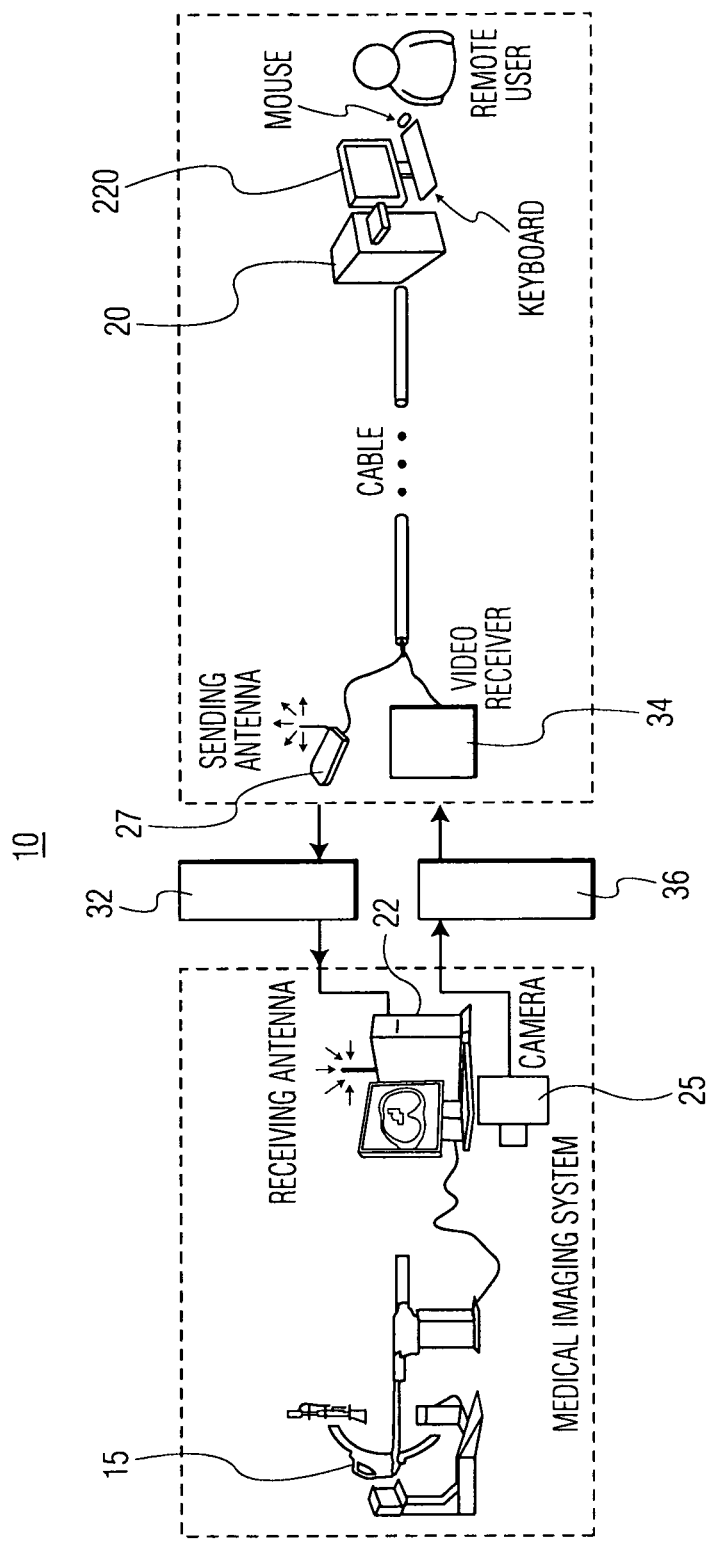
FIG. 1 shows a system for providing remote control and interaction with a medical imaging system, according to invention principles.

A system enables secure, safe remote access and control of stand-alone medical imaging systems without change of imaging system settings or execution of additional programs within a medical imaging system. The system provides physical separation and independence from a medical imaging system, to prevent medical system data corruption, unauthorized access and infection by a software virus and safe and secure remote control operation of a medical imaging system.

A processor as used herein is a device for executing stored machine-readable instructions for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled with any other processor enabling interaction and/or communication there-between. A processor comprising executable instructions may be electrically coupled by being within stored executable instruction enabling interaction and/or communication with executable instructions comprising another processor. A user interface processor or generator is a known element comprising electronic circuitry or software or a combination of both for generating display images or portions thereof. A user interface comprises one or more display images enabling user interaction with a processor or other device.

An executable application comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

FIG. 1 shows system 10 for providing remote control and interaction with a medical imaging system. System 10 includes medical imaging system 15 and receiver unit 22, executing an on-site control transition client application and being coupled to a medical imaging system, for receiving wirelessly transmitted command signals via a first secure wireless communication link 32. In one embodiment receiver unit 22 includes an antenna compatible with commands derived from a wireless mouse or keyboard, for example, so no configuration change or additional software is needed by medical imaging system 15. The command signals enable control of medical imaging system 15 from a remote location. A camera and interface unit 25 wirelessly communicates video data to at least one computer 20 at a remote location via second secure communication link 36 and video receiver unit 34, in response to command signals wirelessly communicated to receiver unit 22. The video data is communicated from a camera located near medical imaging system 15, e.g., in the same room of a hospital, that monitors medical images and associated data presented on a display of medical imaging system 15. In one embodiment, camera and interface unit 25 wirelessly communicates video data to at least one computer 20 and in another embodiment, unit 25 communicates video data to at least one computer 20 via a dedicated cable link.

Transmitter 27 wirelessly transmits command signals via first secure communication link 32 to receiver unit 22 coupled to medical imaging system 15 provided by a particular manufacturer and having a particular version or model identifier. At least one repository within computer 20 stores a command set comprising a set of commands for controlling medical imaging system 15. At least one computer 20 executing in response to a client application receives video data from medical imaging system 15 via video receiver unit 34. The video data is provided by camera and interface unit 25 that monitors medical images and associated data presented on a display of medical imaging system 15 in response to command signals wirelessly communicated to receiver unit 22. Monitor 220 of computer 20 presents the received video data to a user. A user interface of computer 20 (e.g., a mouse and keyboard) enables a user to provide commands for remotely controlling medical imaging system 15. The command signals include data representing commands in the command set.

Figure 2:
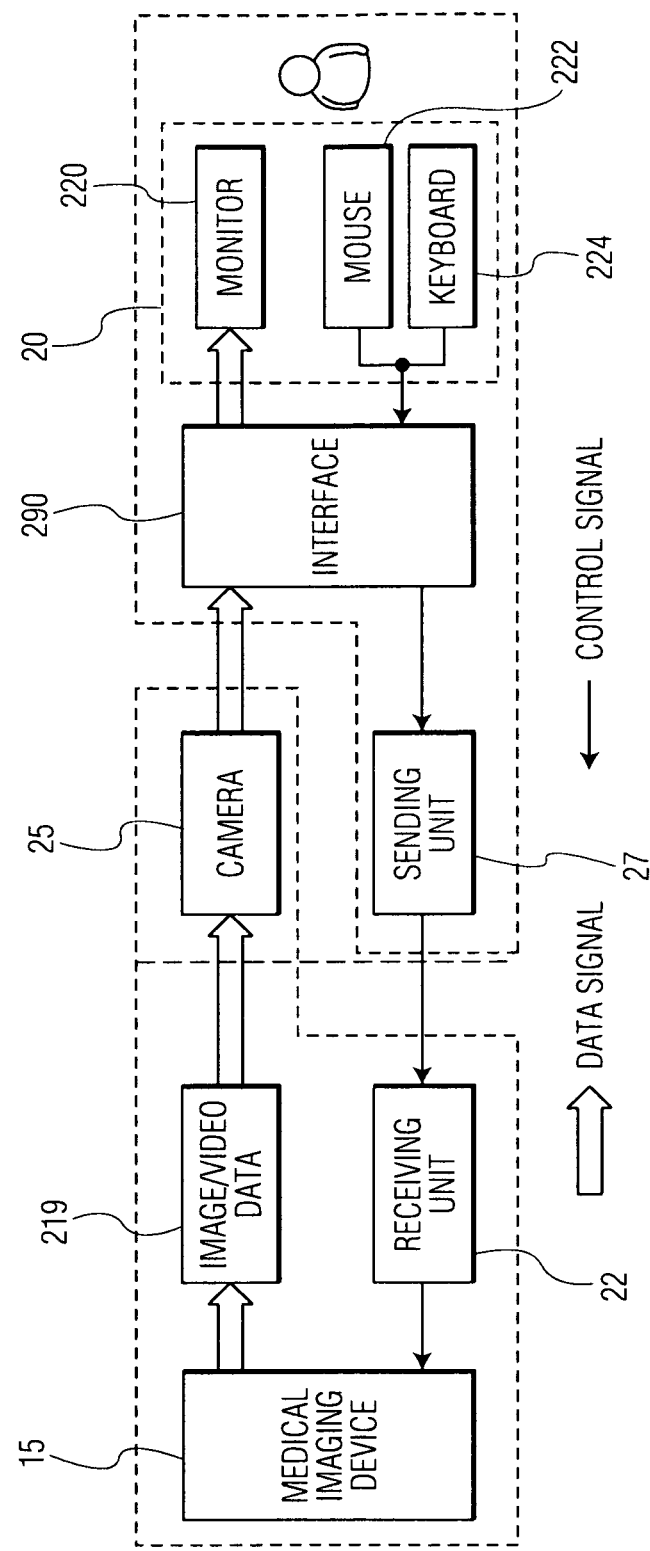
FIG. 2 shows signal flow in a system for providing remote control and interaction with a medical imaging system, according to invention principles.

FIG. 2 shows signal flow in a system for providing remote control and interaction with a medical imaging system. In response to user initiation of a remote control mode, camera 25 captures still image data or video data 219 of medical imaging system 15. Data 219 is transmitted through secure communication link 36 (FIG. 1), received by receiver unit 34 (in interface 290 of FIG. 2) and displayed on a display monitor 220 of at least one computer 20. User initiated command signals generated in response to mouse 222 and keyboard 224 operation of computer 20, are conveyed via interface 290 and wirelessly transmitted by transmitter unit 27 to receiver unit 22. Receiver unit 22 coupled to medical imaging system 15 receives the command signals that are provided to medical imaging system 15 to initiate actions directed by a user at the remote location.

In one embodiment, system 10 eliminates use of a direct cable connection or intranet or public network link between medical imaging system 15 and the control computer 20 at a remote site. Instead, system 10 uses dedicated secure wireless communication links between medical imaging system 15 and the control computer 20 at a remote site. System 10 advantageously excludes software viruses and data corruption from adversely impacting operation of medical imaging system 15 and can be applied to other remote control applications where a controlled system is stand-alone and may not be directly accessed or controlled through cables. Medical imaging systems such as X-ray, angiography, fluoroscopy, CT and MR systems are typically installed isolated from communication networks such as the Internet (and may be isolated from intra-nets such as intra-hospital networks) to maintain patient safety. System 10 avoids compromising medical imaging system isolation by employing a secure dedicated communication protocol and a non-public network (or direct point to point cable). In one embodiment, the system employs a relatively short distance secure wireless protocol such as a Bluetooth compatible protocol over a secure link for communication between medical imaging system 15 and receiver unit 22 as illustrated in FIG. 1. Receiver unit 22 communicates with computer 20 located at a remote site via secure communication link 32 such as a dedicated cable or wireless communication.

System 10 advantageously employs one or more secure restricted command sets used by a remote control client application executed by computer 20. Individual command sets include corresponding commands for different applications such as image post-processing, reporting, trouble-shooting for a particular type, manufacturer and version of imaging modality device 15. Different command sets may support different device type (e.g., MR, CT, Ultrasound, X-ray type of imaging modality devices), different device versions and different device manufacturers. Other command sets support different functions such as education, training on an installed software function, and multi-site collaboration such as for a consultation or for obtaining a second opinion, for example. A command set may also be user or role specific and be tailored for specific user preferences or specific user role (e.g., a technician, physician, radiologist and support staff). In an image processing command set for example, commands of a command set are compatible with a particular medical system type, manufacturer and version. The use of a limited predetermined command set increases system security and reduces opportunity for corruption or interference (deliberate or haphazard). Moreover, additional access verification schemes such as fingerprint recognition are used by the remote control client application executed by computer 20 to reinforce security. Also a user of medical imaging system 15 is able to terminate remote access by computer 20 by shutting down receiver unit 22, for example. In a further embodiment, camera and interface unit 25 comprises an interface unit that forwards video data from medical imaging system 15 without use of a camera, to at least one computer 20 via a secured wired or wireless communication channel. The forwarded video data comprises data that is displayed by imaging system 15 on a workstation of system 15.

Figure 3:
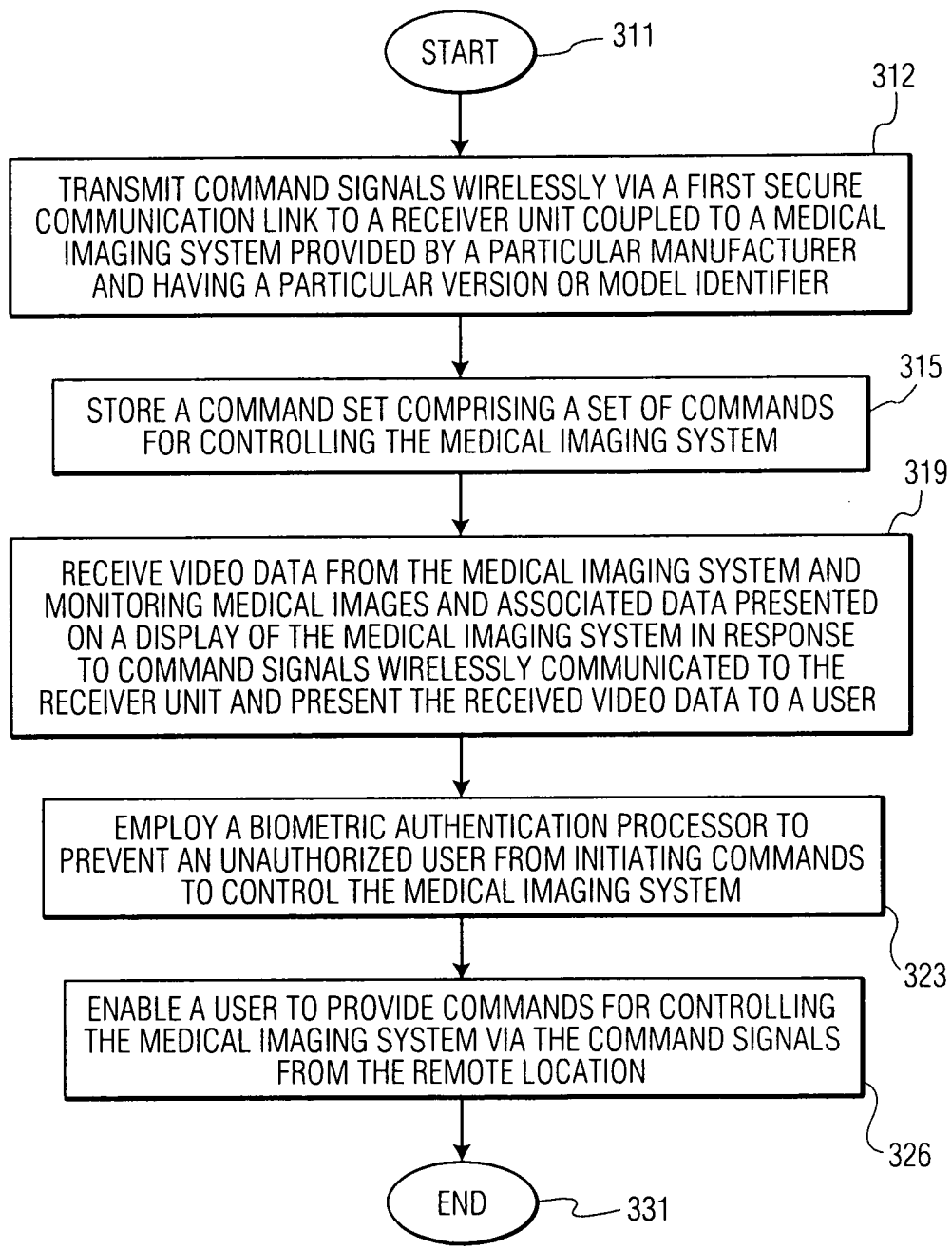
FIG. 3 shows a flowchart of a process employed by a system at a remote location for providing remote control and interaction with a medical imaging system, according to invention principles.

FIG. 3 shows a flowchart of a process employed by system 10 (FIG. 1) at a remote location for providing remote control and interaction with medical imaging system 15. In step 312, following the start at step 311, transmitter 27 wirelessly transmits command signals via first secure communication link 32 to receiver unit 22 coupled to medical imaging system 15 provided by a particular manufacturer and having a particular version or model identifier. Specifically, medical imaging system 15 is of a particular imaging modality type, provided by a particular manufacturer and has a particular version or model identifier. The command signals enable control of medical imaging system 15 from a remote location. In step 315, computer 20 stores in at least one repository in computer 20, a command set comprising a set of secure restricted commands for controlling medical imaging system 15 of the particular imaging modality type, provided by a particular manufacturer and having a particular version or model identifier and the command signals include data representing commands in the command set. Further, the at least one repository advantageously stores multiple different command sets for one or more medical imaging systems associated with at least one of, (a) multiple different imaging modality types including at least two of, MR, CT, Ultrasound and X-ray modality types, (b) multiple different manufacturers of an imaging modality device and (c) multiple different versions or models of an imaging modality device.

The at least one repository stores multiple different command sets for one or more medical imaging systems associated with multiple different user roles and also associated with at least one of, medical imaging system training, medical imaging system education, medical imaging system support and multi-site collaboration and consultation. In step 319, at least one computer 20 receives video data from medical imaging system 15 in response to command signals wirelessly communicated to receiver unit 22. The video data shows medical images and associated data presented on a display of medical imaging system 15 and in one embodiment is received from a camera via a second secure communication link 36. The camera monitors a substantial portion of a room housing medical imaging system 15 including activities by personnel operating system 15. Also the commands for controlling medical imaging system 15 via the command signals from the remote location include command for controlling the camera in at least one of, focus, pan and tilt. In another embodiment at least one computer 20 receives video data directly from medical imaging system 15 without an intervening camera, in response to command signals wirelessly communicated to receiver unit 22 and controlling medical imaging system 15. The video data shows medical images and associated data presented on a display of medical imaging system 15. In another embodiment, the video data is conveyed by a wired link.

In one embodiment, first and second secure communication links 32 and 36 are dedicated, separate and independent non-networked links. In a further embodiment, first and second secure communication links 32 and 36 are a single bidirectional secure wireless communication link. Also, at least one of, the command signals and video data, are encrypted prior to communication in encrypted form on respective first and second secure communication links 32 and 36. A monitor of computer 20 presents the received video data to a user. In step 323, a biometric authentication processor in computer 20 prevents an unauthorized user from initiating commands to control medical imaging system 15. In step 326, a user interface (e.g., keyboard 224 and mouse 222 (FIG. 2) of computer 20) enables a user to provide commands for controlling medical imaging system 15 via the command signals from the remote location. The user interface enables a user to select commands of a command set compatible with medical imaging system 15 and that is compatible with a selected user role. The process of FIG. 3 terminates at step 331.

Figure 4:
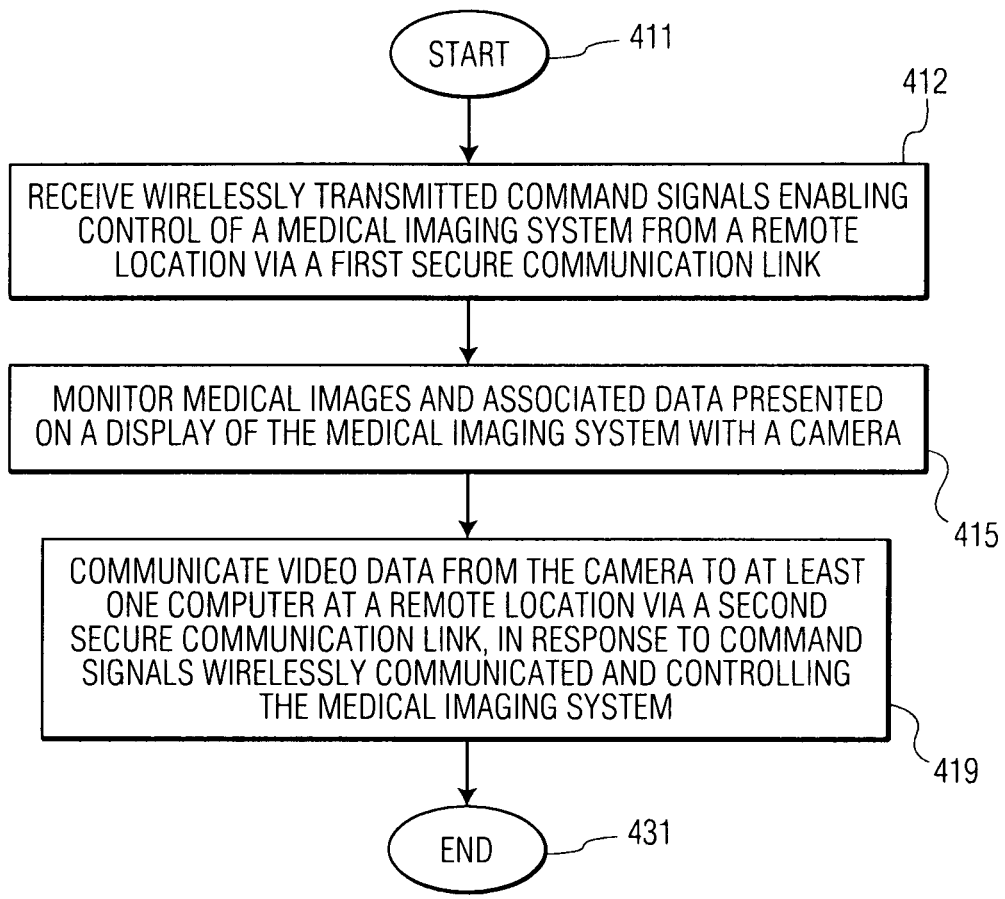
FIG. 4 shows a flowchart of a process employed by a system supporting remote control and interaction with the medical imaging system, according to invention principles.

FIG. 4 shows a flowchart of a process employed by system 10 on site with medical imaging system 15 (FIG. 1) and supports remote control of, and interaction with, medical imaging system 15. In step 412, following the start at step 411, receiver unit 22 coupled to medical imaging system 15, receives wirelessly transmitted command signals via first secure communication link 32. The command signals enable control of medical imaging system 15 from a remote location. In step 415, a camera (in unit 25) located near medical imaging system 15 monitors medical images and associated data presented on a display of medical imaging system 15. In step 419, an interface unit (in unit 25) communicates video data from the camera to at least one computer 20 at a remote location via second secure communication link 36, in response to command signals wirelessly communicated to receiver unit 22 and controlling medical imaging system 15. In one embodiment, first and second secure communication links 32 and 36 are a single bidirectional secure wireless communication link. The process of FIG. 4 terminates at step 431.

The systems and processes of FIGS. 1-4 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system provides a user with remote access and control of stand-alone medical imaging system 15 (FIG. 1) usable in a hospital to provide a user with convenient communication with off-site experts to facilitate addressing technical problems, for example. The system is usable for access to, and control of, a wide variety of different stand-alone devices and systems that may not be directly accessed or controlled through cables, for example. Further, the processes and applications may, in alternative embodiments, be located on one or more (e.g., distributed) processing devices. Any of the functions and steps provided in FIGS. 1-4 may be implemented in hardware, software or a combination of both.

What is claimed is:

1. A system for providing remote control and interaction with a medical imaging system, comprising:
   a transmitter for wirelessly transmitting command signals via a first secure communication link to a receiver unit coupled to a medical imaging system comprising at least one of, a magnetic resonance (MR), computer tomography (CT), and X-ray imaging system, said command signals enabling controlling said medical imaging system from a remote location;
   at least one computer for receiving video data from a camera independent of said medical imaging system and located near said medical imaging system, said camera monitoring medical images and associated data provided by said medical imaging system and presented on a display of said medical imaging system in response to command signals wirelessly communicated to said receiver unit and controlling said medical imaging system;

a monitor for presenting the received video data to a user; and a user interface enabling a user to provide commands for controlling said medical imaging system via said command signals from said remote location.

2. A system according to claim 1, wherein said medical imaging system is of a particular imaging modality type, provided by a particular manufacturer and has a particular version or model identifier and including at least one repository for storing a command set comprising a set of commands for controlling said medical imaging system of said particular imaging modality type, provided by a particular manufacturer and having a particular version or model identifier and said command signals include data representing commands in said command set.

3. A system according to claim 2, wherein said medical imaging system comprises at least one of, a magnetic resonance (MR), computer tomography (CT), Ultrasound and X-ray imaging system, at least one repository stores a plurality of different command sets for a plurality of medical imaging systems associated with at least one of,
 (a) a plurality of different imaging modality types including at least two of, MR, CT, Ultrasound and X-ray modality types,
 (b) a plurality of different manufacturers and
 (c) a plurality of different versions or models and said user interface enables a user to select commands of a command set compatible with said medical imaging system.

4. A system according to claim 1, wherein the first communication link is a dedicated, separate and independent non-networked link.

5. A system according to claim 2, wherein at least one repository stores a plurality of different command sets for one or more medical imaging systems associated with at least one of,
 (a) medical imaging system training,
 (b) medical imaging system education,
 (c) medical imaging system support and
 (d) multi-site collaboration and consultation and said user interface enables a user to select commands of a command set compatible with said medical imaging system.

6. A system according to claim 2, wherein at least one repository stores a plurality of different command sets for one or more medical imaging systems associated with a plurality of different user roles and said user interface enables a user to select commands of a command set compatible with said medical imaging system and a selected user role.

7. A system according to claim 2, including a biometric authentication processor used to prevent an unauthorized user from initiating commands of said command set to control said medical imaging system.

8. A system according to claim 2, wherein said command set comprises a set of secure restricted commands.

9. A system according to claim 1, wherein said video data is received from said camera via a second secure communication link independent of said first secure communication link.

10. A system according to claim 9, wherein the first and second secure communication links are dedicated, separate and independent non-networked links.

11. A system according to claim 2, wherein at least one of,
 the command signals and
 video data,
are encrypted prior to communication in encrypted form on respective first and second secure communication links.

12. A system according to claim 2, wherein the first and second secure communication links are a single bidirectional secure wireless communication link.

13. A system according to claim 1, wherein the commands for controlling said medical imaging system via said command signals from said remote location include commands for controlling said camera in at least one of, focus, pan and tilt.

14. A system according to claim 1, wherein the camera monitors a substantial portion of a room housing said medical imaging system including activities by personnel operating said medical imaging system.

15. A system for enabling remote control and interaction of a medical imaging system by command from a remote location, comprising:

a receiver unit coupled to a medical imaging system, for receiving wirelessly transmitted command signals via a first secure communication link, said command signals enabling control of a medical imaging system comprising at least one of, a magnetic resonance (MR), computer tomography (CT), and X-ray imaging system from a remote location;

a camera located near said medical imaging system for monitoring medical images and associated data provided by said medical imaging system and presented on a display of said medical imaging system, said camera being independent of said medical imaging system; and an interface unit for communicating video data from said camera to at least one computer at a remote location via a second secure communication link, in response to command signals wirelessly communicated to said receiver unit and controlling said medical imaging system.

16. A system according to claim 15, wherein the first and second secure communication links are a single bidirectional secure wireless communication link.

17. A system for providing remote control and interaction with a medical imaging system, comprising:

a transmitter for wirelessly transmitting command signals via a first secure communication link to a receiver unit coupled to a medical imaging system comprising at least one of, a magnetic resonance (MR), computer tomography (CT), and X-ray imaging system provided by a particular manufacturer and having a particular version or model identifier, said command signals enabling controlling said medical imaging system from a remote location;

at least one repository for storing a command set comprising a set of commands for controlling said medical imaging system;

at least one computer for receiving video data from a camera independent of said medical imaging system, said video data showing medical images and associated data provided by said medical imaging system and presented on a display of said medical imaging system, in response to command signals wirelessly communicated to said receiver unit and controlling said medical imaging system;

a monitor for presenting the received video data to a user; and a user interface enabling a user to provide commands for controlling said medical imaging system via said command signals from said remote location, said command signals including data representing commands in said command set.

18. A system according to claim 17, wherein said medical imaging system comprises at least one of, a magnetic resonance (MR), computer tomography (CT), Ultrasound and X-ray imaging system, said at least one repository stores a plurality of different command sets for a plurality of medical imaging systems associated with at least one of,
  (a) a plurality of different imaging modality types,
  (b) a plurality of different manufacturers and
  (c) a plurality of different versions or models and said user interface enables a user to select commands of a command set compatible with said medical imaging system.

19. A method for providing remote control and interaction with a medical imaging system, comprising the activities of:

wirelesly transmitting command signals via a first secure communication link to a receiver unit coupled to a medical imaging system comprising at least one of, a magnetic resonance (MR), computer tomography (CT), and X-ray imaging system, said command signals enabling controlling said medical imaging system from a remote location;

receiving video data from a camera independent of said medical imaging system and located near said medical imaging system, said camera monitoring medical images and associated data provided by said medical imaging system and presented on a display of said medical imaging system in response to command signals wirelessly communicated to said receiver unit and controlling said medical imaging system;

presenting the received video data to a user; and enabling a user to provide commands for controlling said medical imaging system via said command signals from said remote location.

* * * * *